United States Patent [19]

Lobaugh

[11] 3,728,796
[45] Apr. 24, 1973

[54] CENTER LINE LOCATOR FOR PIPES AND THE LIKE

[76] Inventor: Lawrence E. Lobaugh, 132 Wilson Avenue, Niles, Ohio 44446

[22] Filed: July 22, 1971

[21] Appl. No.: 165,167

[52] U.S. Cl. .................................33/343, 33/371
[51] Int. Cl. ..............................................G01c 9/00
[58] Field of Search.................23/21 R, 21 C, 174 N, 23/207 R, 189, 332, 340, 341, 343, 370, 371, 372, 373

[56] References Cited

UNITED STATES PATENTS

| | | | |
|---|---|---|---|
| 1,610,193 | 12/1926 | Battle | 33/174 N |
| 948,523 | 2/1910 | Perkins | 33/207 R |
| 2,213,148 | 8/1940 | Pyle | 33/174 N |
| 3,331,134 | 7/1967 | Jackson et al. | 33/174 N |

*Primary Examiner*—Leonard Forman
*Assistant Examiner*—Charles E. Phillips
*Attorney*—Webster B. Harpman

[57] ABSTRACT

A center line locator for pipes and the like consists of an arcuate member, the curve of which matches the circumference of the pipe and an angle shaped body member secured thereto at its ends and incorporating a bubble level in one section thereof. The arcuate member is applied to a pipe and moved circumferentially thereof until the bubble level indicates a level condition whereupon indicia on the arcuate member indicate the longitudinal upper center line of the pipe and the longitudinal side center line of the pipe.

5 Claims, 2 Drawing Figures

Patented April 24, 1973

3,728,796

INVENTOR.
LAWRENCE E. LOBAUGH
BY W.B.Hanfman
ATTORNEY

CENTER LINE LOCATOR FOR PIPES AND THE LIKE

BACKGROUND OF THE INVENTION

1. Field of the Invention

This invention relates to devices for establishing center lines on pipe and similar cylindrical articles.

2. Description of the Prior Art

Prior structures of this type have employed several means of establishing a center line on a pipe or similar article and utilize level indicating means for doing so. See for example U.S. Pat. Nos. 1,610,193; 2,531,077 and 3,548,508.

This invention eliminates the need of revolving the pipe on which the center line is to be located and will as quickly and easily locate the upper longitudinal center line as well as the side center line simultaneously. It is easily adapted by substitution of arcuate shapes of different curves to enable center lines on pipes of various diameters to be quickly and easily located.

SUMMARY OF THE INVENTION

A center line locator for pipes and the like comprises an arcuate member extending more than 90° and having an angle body removably secured thereto, the angle body having a bubble level incorporated in one portion thereof. The arcuate body is applied to the upper quarter portion of a section of pipe and moved circumferentially of the pipe until the bubble level indicates a level position whereupon degree markings adjacent the ends of the arcuate member established the upper and the side center lines of the pipe on which the device is located. Arcuate members of different curve configurations enable the device to be used with pipes of various diameters.

DESCRIPTION OF THE PREFERRED EMBODIMENT

Figure 1:
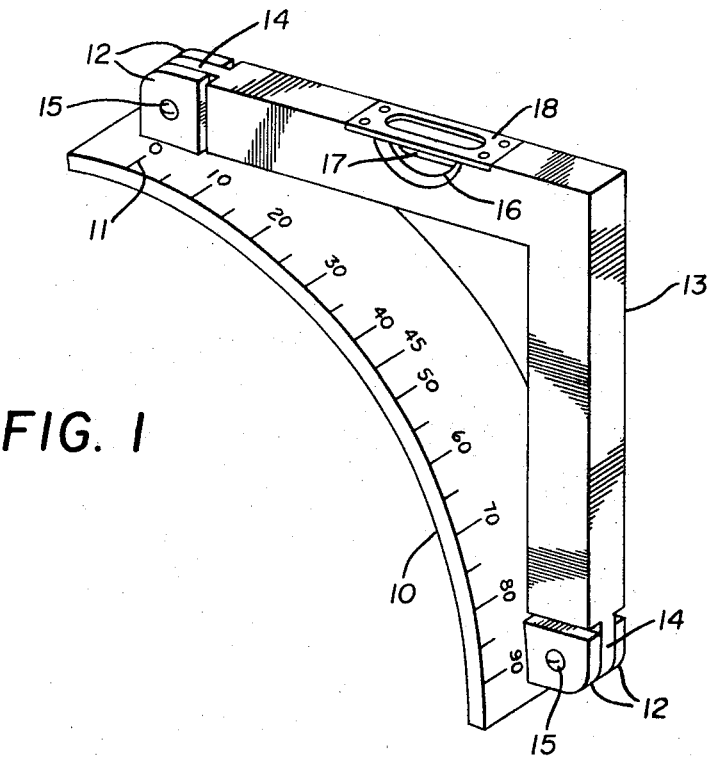
FIG. 1 is a perspective view of the center line locator for pipes and the like and FIG. 2 is a perspective view of a portion of a pipe or similar article illustrating a center line locator positioned thereon with lines indicating the center lines of the pipe as established thereby.

In its simplest form the center line locator for pipes and the like as disclosed herein comprises an arcuate body member 10 having degree indicia markings 11 positioned along one edge thereof and extending from 0° to 90°. It will be observed that the length of the arcuate body member 10 is such that it preferably extends beyond the 0° and the 90° marking points.

Spaced apertured brackets 12 are formed on both ends of the arcuate body member 10 at locations thereon corresponding with the 0° and 90° marks and extend outwardly therefrom. A right angular body member 13 has apertured extensions 14 on its opposite ends which apertured extensions 14 register between the spaced brackets 12 on the arcuate body member 10 and are detachably secured thereto by fasteners 15. One section of the right angular body member 13 is provided with a cutaway area 16 in which a bubble level 17 is located and which bubble level 17 is provided with a mounting and protective slotted plate 18 which is attached to the right angular body member 13.

Figure 2:
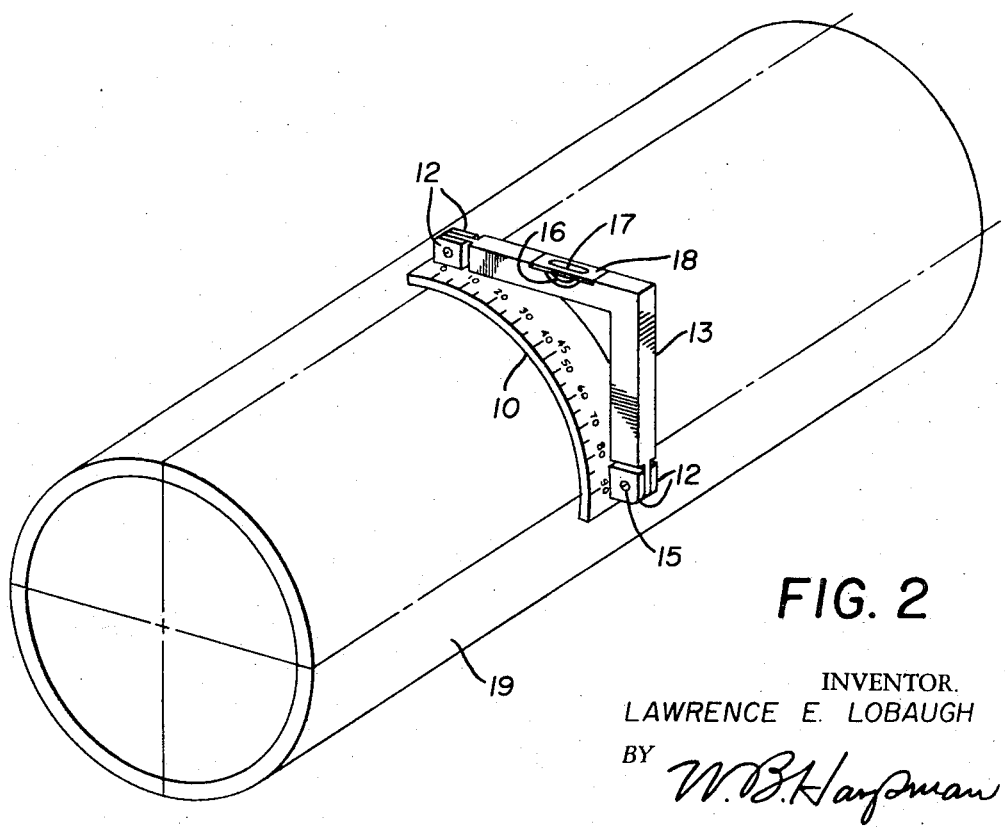

By referring now to FIG. 2 of the drawings a section of pipe 19 may be seen and it will be observed that the center line locator for pipes and the like is shown in position thereon with the 0° end of the arcuate member 10 in uppermost position.

Those skilled in the art will observe that by moving the center line locator circumferentially of the pipe 19 while observing the bubble level 17 the center line locator can quickly and easily be positioned with the upper horizontal portion of the right angular body member 13 on a true horizontal line. When this occurs as indicated by the bubble level 17 the 0° marking on the arcuate body member 10 will be positioned on the longitudinal upper center line of the pipe 19 and the 90° marking on the arcuate body member 10 will be positioned on the longitudinal side center line of the pipe 19.

Still referring to FIG. 2 of the drawings it will be seen that lines have been applied longitudinally of the pipe 19 and on the upper and side center lines thereof as hereinbefore determined by the center line locator and that at the left end of the pipe 19, these lines have been extended in transverse relation to the pipe 19 to indicate the actual center of the pipe 19 if the same is desired.

Those skilled in the art will observe that in the illustration of FIG. 2 of the drawings the curve of the arcuate body member 10 corresponds with the curve of the outer surface of the pipe 19 and it will be obvious that when a pipe of a different diameter comprises the work piece, a different arcuate body member 10 having a matching exterior curve is attached to the right angular body member 13 whereupon the center line indicator is adapted for use on the pipe of different diameters.

Although but one embodiment of the present invention has been illustrated and described it will be apparent to those skilled in the art that various changes and modifications may be made therein without departing from the spirit of the invention and having thus described my invention, what I claim is:

1. A center line locator for pipes and the like consisting of an arcuate body member having a right angular body member secured thereto and extending outwardly therefrom in an inverted V-shape, said arcuate body having a radius of curvature which corresponds to the radius of curvature of the exterior of the pipe or the like on which the locator is applied, a bubble level disposed in one portion of said right angular body member and indicia comprising degree markings formed on said arcuate body member with a 0° marking being in uppermost position when said bubble level is in level position, said indicia being disposed adjacent the edge of said arcuate member so that when said member is placed on a pipe or the like the indicia will be adjacent said pipe or the like to provide a reference for marking said pipe.

2. The center line locator for pipes and the like set forth in claim 1 and wherein the arcuate body member is bowed into the area of the right angular body member.

3. The center line locator for pipes and the like set forth in claim 1 and wherein the right angular body member consists of 2 portions of equal length joined to one another at their converging ends.

4. The center line locator for pipes and the like set forth in claim 1 and wherein the right angular body member has apertured extensions on its ends detachably engaged between pairs of apertured brackets on said arcuate body member.

5. The center line locator for pipes and the like set forth in claim 1 and wherein the right angular body member consists of 2 straight portions of equal length joined to one another at their converging ends.

* * * * *